Oct. 5, 1954 R. ORCHOWSKI 2,690,757
INFLATION AND DEFLATION VALVE FOR PNEUMATIC TIRES
Filed Sept. 15, 1949

Inventor:
Richard Orchowski
By Auterstorhaugh&Co
his Atty's

Patented Oct. 5, 1954

2,690,757

UNITED STATES PATENT OFFICE 2,690,757

INFLATION AND DEFLATION VALVE FOR PNEUMATIC TIRES

Richard Orchowski, Fisher Branch, Manitoba, Canada

Application September 15, 1949, Serial No. 115,821

2 Claims. (Cl. 137—226)

My invention relates to valves for pneumatic tires, particularly for inflating and deflating such tires, an object of which is to provide a valve of the character herewithin described which prevents over-inflation or excessive pressure therein.

A further object of my invention is to provide a valve of the character herewithin described which permits the normal or customary method of inflating tires but which incorporates means to prevent the pressure therein from rising above a predetermined value.

In addition to the foregoing object, my invention provides a valve of the character herewithin described which permits the pre-selection of desired pressure and means to adjust the valve mechanism to that pressure.

A further object of my invention is the provision of the herein described valve whereby the tire in which it is fitted, is protected from temporary pressure surges or gradual increase in pressure by automatically releasing air until the pre-selected pressure is recovered. This condition is commonly experienced, for example, during hot weather, or as a result of hard driving.

Another object of my invention is to provide a pneumatic tire valve of the character herewithin described which provides all the advantages alluded to herein, but which is readily adaptable to, and not a replacement of, conventional valves and the casings thereof.

Still another object of my invention is to provide a valve of the character herewithin described which eliminates the use of a tire inflation gauge, thus increasing efficiency by reducing the operations necessary to proper inflation of tires.

A still further object of my invention is to provide a pneumatic tire valve of the character herewithin described which is relatively economical, simple to install and operate, and otherwise well suited for the purpose for which it is designed.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 1:
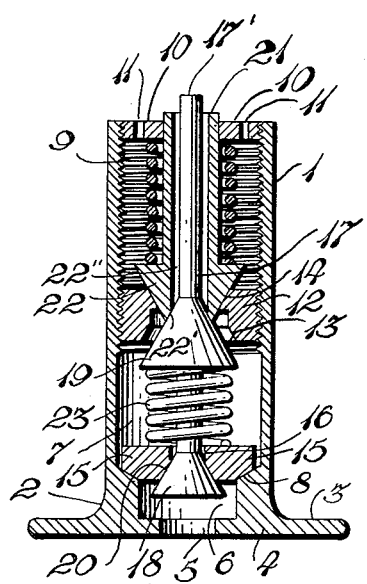
Fig. 1 is a side elevation of my invention in the closed position, sectioned in part to show the interior thereof.
Figure 2:
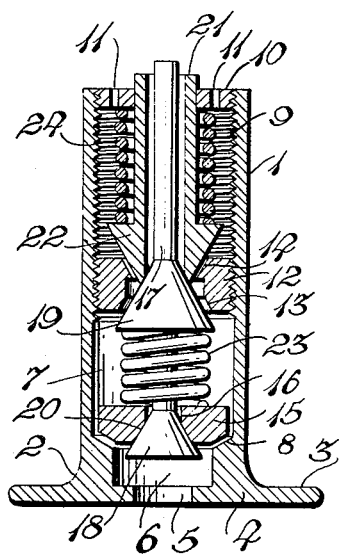
Fig. 2 is a view similar to Fig. 1 but with the valve in the open, or "air release," position.

The first embodiment of my invention as depicted in Figs. 1 and 2 of the drawings herewith may be described as follows:

A cylindrical outer valve casing 1 provides the housing for my valve body. The lower part of the casing 2 is fitted with an annular flange 3 which is integral with the centrally apertured valve base 4. Immediately above this aperture or passage 5 is a slightly enlarged air chamber 6, which is simply a smooth-bored, short, cylindrical boring in the casing. Above this chamber is a larger air compression chamber 7, of larger bore and greater volume. Between these two chambers is a conically-shaped valve seating 8, the projected area of which is determined by the difference in the diameters of these two chambers. The upper chamber 7 terminates in the internally threaded portion 9 of the casing. Into this threaded bore, two discs are threaded. The upper one is a centrally-apertured cap 10, which is pierced by a number of drillings 11, through which air is released to the atmosphere from within the valve body. The lower threaded disc 12 alluded to above, is provided with a valve seating 13 on the upper side thereof communicating with an enlarged seat 14 upon the opposite side leading into the aforementioned chamber 7. The position of this valve seating is adjustable by means of its threading, in vertical relation to the upper expansion chamber 7, and the upper cap 10.

In the expansion chamber, and seating upon the lowest valve seat 8, is what I define as a centrally-apertured compound, floating valve disc 15.

Through the enlarged central aperture 16 of this valve disc, the main valve stem 17 is assembled. This stem is fitted with two frusto-conical valve heads 18 and 19. The lower of these, to wit, 18, seats upon an inverted conical seating 20, in the floating valve disc 15.

Associated with the aforementioned valve stem 17, a concentrically disposed tubular valve stem 21 seats upon valve seating 14, within disc 12 by virtue of its frusto-conical head 22. Valve stem 21 surrounds stem 17 and is provided with a relatively small conical seating 22' at the lower end thereof communicating with the interior bore 22"

within which the second valve head 19 upon stem 17 is engageable.

Finally, but nonetheless important, two opposing compression springs 23 and 24 are provided. The first-mentioned of these, namely, the lower one 23, reacts between valve disc 15 and the underside of valve head 19 and maintains the disc 15 upon its seating 8, as well as valve head 18 upon its associated valve seating 20, thus performing a dual function.

The other compression spring 24 reacting between cap 10 and the upper side of valve head 22 of the tubular valve stem 21 maintains this valve head 22 upon its seating 14. Simultaneously, moreover, this same spring acts through the head 22 and seating 22' of the tubular stem 21, upon the frusto-conical head 19 of the main valve stem 17. By this means spring 24 acts in opposition to spring 23, maintaining seating of valve 19 upon its small seat 22' within the tubular valve head.

When the air receiver, which for purposes of example I have considered to be a tire (not illustrated) is to be inflated, air is forced against the upper end of the inflation and deflation valve in the normal manner either by a manual or mechanical pressure pump. In the case of the former, pressure builds up within the tubular valve stem 21, until sufficient to overcome the resistance of compression spring 23. The spring yields, unseating valve 19 from its seating 22' within the tubular bore 22" of valve head 22. Air is thus admitted to expansion chamber 7.

In this same chamber, pressure of the admitted air acts upon the floating valve disc 15, assisting compression spring 23 to maintain said valve disc upon its seat 8.

Valve head 18 is thus simultaneously unseated from its associated seat 21, admitting air into the small expansion chamber 6, at the base of the valve casing, and thence through passage 5, into the receiver or tire. However in the case of a mechanical pump, the air chuck is placed over the upper end of the casing 1, thus depressing the extending end of stem 17 and unseating valves 18 and 19 so that air passes thereby. In either case the source of air supply may be equal to or greater than the desired tire pressure, as determined by the adjustment of spring 23. If the latter, then when the source of air supply is removed, the excess air pressure in the tire overcomes spring 23 and opens valve disc 15 with concomitant opening of the valve 22 against pressure of spring 24, by virtue of the excessive air pressure acting through spring 23 and valve member 19 against valve 22. Air may then escape from the chamber 7 into the threaded bore of the valve casing 9 and thence through the drillings 11 into the atmosphere.

Thus when the pressure within the tire reaches the desired, predetermined pressure a state of equilibrium is attained on both sides of floating valve disc 15 allowing said valve to close. However, any small increment in pressure developed from any cause within the tire, at this stage, would unseat this same disc from its associated seating 8.

This will unseat valve head 22 from its seat 14 and permit air to escape from the chamber 7, below, and thus from the tire below that again, into the threaded bore of the valve casing 9, and thence through the drillings 11, into the atmosphere.

This train of events, namely, the automatic release of air from within the tire, can be set off by any excessive air pressure within the tire caused by heat derived from high ambient air temperatures, or friction due to hard driving etc. Thus the danger of initial and/or developmental over-inflation is minimised.

Manual deflation of the tire is accomplished in much the same manner. Digital or instrumental depression of the valve stem 17 at its upper, protruding end 17' depresses the said stem and actuates both valve heads integral with it, namely, valve heads 19 and 18, and when the resistance of spring 23 has been overcome, both become unseated from seats 22' and 20, respectively. The valve is thus opened providing a passage for air from within the tire to exhaust through the valve, and into the atmosphere via the interior of the tubular stem 21.

Throughout the foregoing there are references to predetermined pressure setting of the valve. It will be obvious by now that the action of the valve is determined by the opposing resistance of the two springs 23 and 24. Initial compression in both is postulated through this discussion. However, to adjust for variation in the pressure at which the valve will automatically open the degree of mutual interaction is varied by altering the vertical position of the adjustable disc 12. This is easily accomplished by screwing it in either up or down direction within the threaded portion 9 of the valve casing. Further adjustment is provided by screwing the cap 10 up or down thereby influencing primarily spring 24 but secondarily spring 23.

Figure 3:
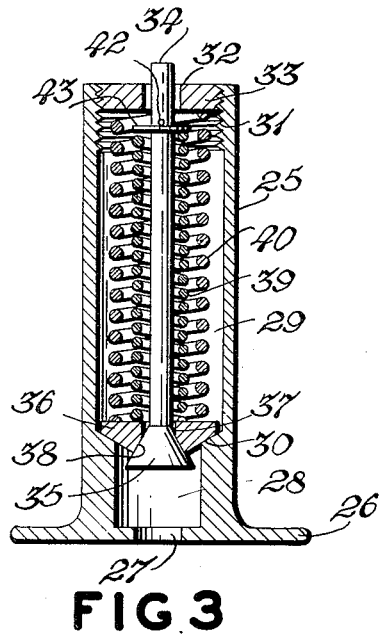
Fig. 3 is a side elevation of an alternative embodiment of my device with the valve in the closed position, sectioned in part to show the interior thereof.
Figure 4:
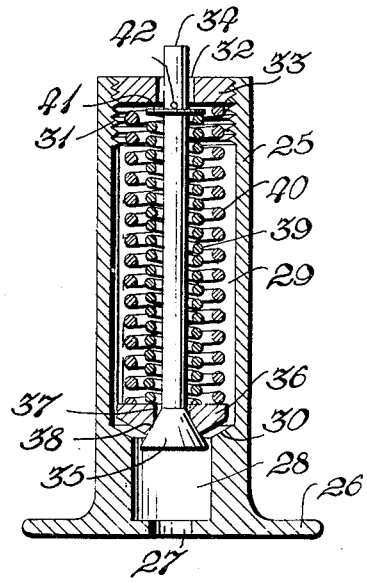
Fig. 4 is a view similar to Fig. 3 but with the valve in the open, or "air release," position.

Turning now to consideration of an alternative embodiment of my invention, reference is to be had to Figs. 3 and 4 of the accompanying drawing.

A cylindrical outer casing 25, fitted with an annular flange 26, having a central aperture 27 provides the housing for this embodiment. Immediately above this aperture, or passage, is a slightly enlarged air chamber 28, comprising a short, smooth-bored cylinder. Above this chamber is a larger air chamber 29 of full bore, and extending almost the full length of the balance of the valve casing.

Between these two chambers a conically-shaped valve seating 30 is formed of the restricted wall of the lower air chamber.

The upper chamber terminates in the internally screw-threaded section 31 of the casing. Into this bore, a centrally apertured disc cap 33 is fitted, which serves also by virtue of the threading as a means of adjustment to the valve as will hereinafter become apparent.

Valve stem 34 fits through the aperture 32 in the cap 33. This aperture, be it noted, is enlarged and does not bear upon the stem, although centering support is derived therefrom. The lower end of this stem terminates in a frusto-conical valve head 35. This valve head seats upon a floating compound valve disc 36, which has incorporated within it an enlarged central aperture 37 and an inverted conical seating 38. This disc in turn has a lower inverted conical surface and in turn seats upon valve seating 30, in the casing, and is similar to valve disc 15 described in the previous embodiment.

Bearing upon the upper surface of this floating disc 36 are two concentric, compression springs 39 and 40. These act in opposition to each other, and are disposed so that spring 39 is the inner and is surrounded by spring 40.

However inner spring 39 bears upon centrally apertured washer 41 which is free to slide along stem 34 in a downward direction, but is restrained from upward motion by pin 42, which is inserted in a drilling provided therefor in valve stem 34. Outer spring 40 on the other hand bears upon disc cap 33, which then, as has been pointed out previously, permits adjustment in the degree of compression imposed upon said spring. This, as will be seen, and similarly to the same feature in the original embodiment already described hereinbefore, allows for the pre-determination of the pressure desired in the tire associated with my invention.

To inflate the tire, air is admitted under pressure to the interior of the valve casing 25, through the enlarged aperture 32 in the valve cap 33. Air pressure is built up within the large air chamber 29 and is admitted to bear upon the frusto-conical surface of valve head 35, in the annular enlargement 37 of the central aperture of the valve disc 36.

When this air pressure is sufficient to overcome the resistance of spring 39, valve head 35 is depressed and is unseated from the associated seating 38, in valve disc 36. Air will then flow through chamber 28 and passage 27 into the tire, as long as pressure is maintained.

Once again, as in the previous embodiment, the tire may be over-inflated, but when the source of air pressure is removed from the valve, the valve head 35 closes and the excess pressure in the tire will act upon the underside of the valve discs 35 and 36.

When this occurs, floating valve disc 36 becomes unseated from its seating 30, in the valve casing 25. This permits air to escape from air chamber 28 into upper air chamber 29.

This open position then is an automatic deflationary position, since air is being allowed to escape from the interior of the tire through the herein described valve, and will exhaust to atmosphere if the source of incoming air pressure is removed from the inlet end 32 of the valve. This condition will arise under circumstances giving rise to excess air pressure within the tire during hot weather or the like, as previously outlined in the other original embodiment.

Again as in the previous case, deflation can be initiated by digital or instrumental pressure upon the protruding end of valve stem 34. This will, when great enough to overcome the resistance of spring 39, unseat valve head 35 from its seating 38, and permit the exhaustion of air from within the tire, thus deflating it.

In this embodiment, it will be observed, there is no provision for adjusting spring resistance of spring 39, except that any adjustment in spring 40 affects the inter-action of the two springs by varying the relative resistance of one to the other. At the same time the wound length of spring 39 will not be altered by any alteration in the standing length of spring 40 by adjustment of disc cap 33 unless disc cap 33 is lowered sufficiently to engage washer 43.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An inflation and deflation valve for pneumatic tires comprising in combination a cylindrical outer casing, a centrally apertured cap secured to the upper end of said casing, a valve seating adjacent the base of said casing, a centrally apertured compound floating valve disc engageable with said seating, said floating valve disc having a valve seating upon the underside thereof communicating with said central aperture, a valve stem extending longitudinally through said outer casing and slidably engageable within said cap and said floating valve disc, a pair of valves situated along the length of said valve stem, one of said valves being engageable upon said valve seating within said floating valve disc, a further valve seating situated between said first-mentioned valve seating and said cap, a tubular valve stem surrounding said first-mentioned valve stem, a valve on the lower end thereof, said valve engaging upon said last-mentioned valve seating, a further valve seating upon the lower end of said tubular stem communicating with the interior thereof, the other of said valves upon said first-mentioned valve stem engaging with said tubular stem seat, a compression spring for urging the valves on said stem upon their respective seatings, a further spring for urging said floating valve disc upon said valve seating adjacent the base of said outer casing against pressure of air up to a predetermined pressure, and means for adjusting the compression of said springs.

2. An inflation and deflation valve for pneumatic tires comprising in combination a cylindrical outer casing, a centrally apertured cap secured to the upper end of said casing, an inverted frusto-conical valve seating adjacent the base of said casing, a centrally apertured compound floating valve disc engageable with said seating, said floating valve disc having a conical valve seating upon the underside thereof communicating with said central aperture, a valve stem extending longitudinally through said outer casing, a conical valve head on the lower end thereof engageable with the seating within said floating valve disc, a tubular valve stem surrounding said first-mentioned valve stem and slidably engageable within said cap, a conical seating formed internally within the base of said second-mentioned stem, a further conical valve head upon said first-mentioned stem engageable within said seating upon said second-mentioned stem, an adjustable valve seating screw-threadably engageable within said outer casing and situated between the ends thereof, an inverted frusto-conical valve head formed externally upon the base of said tubular valve stem and engageable within said last-mentioned seating, a compression spring surrounding said first-mentioned valve stem and re-acting between the underside of said second-mentioned valve head thereon and said floating valve disc, a further compression spring re-acting between said cap and the upper side of said inverted frusto-conical valve head upon the base of said tubular valve stem, and means for adjusting the compression of said springs.

References Cited in the file of this patent

UNITED STATES PATENTS

| Number | Name | Date |
|---|---|---|
| 1,004,986 | Buckett | Oct. 3, 1911 |
| 1,369,343 | Lamb | Feb. 22, 1921 |